United States Patent [19]
Flynn

[11] 3,865,658
[45] Feb. 11, 1975

[54] PROPELLANT COMPOSITION CONTAINING NITROCELLULOSE AND A COPOLYMER OF PERFLUOROGUANIDINE AND FORMALDEHYDE

[75] Inventor: James P. Flynn, Midland, Mich.

[73] Assignee: The Dow Chemical Company, Midland, Mich.

[22] Filed: May 28, 1965

[21] Appl. No.: 460,620

[52] U.S. Cl. ............... 149/19.3, 149/19.8, 149/20, 149/38
[51] Int. Cl. ............................................. C06d 5/06
[58] Field of Search ............................. 149/17–19, 149/109, 20, 19.3, 19.8, 38

[56] References Cited
UNITED STATES PATENTS
3,228,936   1/1966   Davis et al. ..................... 149/109 X

OTHER PUBLICATIONS

Emeleus et al., "Advances in Inorganic Chem.," Vol. 3, (1961), pp. 356–436.

*Primary Examiner*—Benjamin R. Padgett
*Attorney, Agent, or Firm*—C. Kenneth Bjork

[57] ABSTRACT

The present invention is a novel double base propellant composition exhibiting a high specific impulse and containing particulated solid fuel, particulated solid oxidizer, a copolymer of formaldehyde and perfluoroguanidine, nitrocellulose and a difluoroamino containing organic ester as a plasticizer and binder. The incorporation of the difluoroamino ester material as binder and perfluoroguanidine-formaldehyde copolymer into the composition assures the high performance of the propellant.

5 Claims, No Drawings

PROPELLANT COMPOSITION CONTAINING NITROCELLULOSE AND A COPOLYMER OF PERFLUOROGUANIDINE AND FORMALDEHYDE

This invention relates to propellants and more particularly is concerned with a novel double base propellant composition exhibiting a high specific impulse.

It is a principal object of the present invention to provide a novel high energy propellant composition exhibiting a high specific impulse.

It is another object of the present invention to provide a novel double base solid propellant composition that cures to a rubbery elastomer without undesirable gas formation.

These and other objects and advantages readily will become apparent from the detailed description presented hereinafter.

The present invention comprises a solid double-base propellant composition containing from about 3 to about 18 weight per cent of a particulated solid fuel, from about 1 to about 44 weight per cent of a particulated solid oxidizer, from about 15 to about 54 weight per cent of a copolymer of perfluoroguanidine and formaldehyde, from about 10 to about 18 weight per cent nitrocellulose and from about 10 to about 30 weight per cent of a difluoramino containing organic ester as a plasticizer for the nitrocellulose and binder.

Ordinarily the fuel is a member selected from the group consisting of boron, beryllium, aluminum, beryllium hydride, aluminum hydride, lithium hydride, lithium aluminum hydride, solid boron hydrides, boron hydrides of amine complexes and mixtures thereof.

The oxidizer employed in the composition usually is selected from the group consisting of ammonium perchlorate, nitronium perchlorate, ammonium nitrate, hydrazine nitroformate, cyclotrimethylenetrinitramine, hydrazine perchlorate, hydroxylamine perchlorate and the like.

Generally monomers and homopolymers or copolymers of difluoramino-containing organic esters such as 2,3-bis(difluoramino)propyl acrylate, 2,3-bis(difluoramino)propyl methacrylate, 2,3-bis(difluoramino)propyl formate, mixtures of these difluoramino propyl esters with ethylene glycol dimethyl acrylate and the like are used as a plasticizer for the nitrocellulose and the binder. The 2,3-bis(difluoramino)propyl formate is a preferred plasticizer and binder.

Perfluoroguanidine-formaldehyde copolymers employed in the present composition are those materials corresponding to the formula $[(NF_2)_2CNF(CH_2O)_y]_x$ where $y$ is an integer ranging from 1 to about 6 or more and $x$ is an integer greater than 1. A preferred composition is the 1:1 copolymer, i.e. where $y$ is the integer 1.

These copolymers can be prepared by reacting formaldehyde ($CH_2O$) with perfluoroguanidine, herein referred to as PFG, at a $CH_2O$/PFG gram-mole ratio of about 1 in the presence of from about 2 to about 10 weight per cent (based on the total reactants) of a cesium fluoride or rubidium fluoride catalyst at a maximum temperature of about minus 20° C. for a period of at least several hours.

One preferred embodiment of the present novel double base propellant composition consists essentially of on a weight basis about 12 per cent lithium, about 18 per cent nitronium perchlorate, about 42 per cent of a substantially 1:1 copolymer of perfluoroguanidine-formaldehyde, about 14 per cent plastisol grade nitrocellulose and as a plasticizer and binder about 14 per cent 2,3-bis(difluoramino)propyl formate.

A second preferred embodiment of the present invention consists essentially of on a weight basis 12 per cent lithium, about 8 per cent ammonium perchlorate, about 42 per cent of the perfluoroguanidine-formaldehyde copolymer, about 16 per cent plastisol grade nitrocellulose and as a plasticizer and binder about 16 per cent 2,3-bis(difluoramino)propyl formate.

The propellants usually are fabricated by adding and blending the fuel and oxidizer into a mixture of the perfluoroguanidine-formaldehyde, nitrocellulose and 2,3-bis(difluoramino)propyl formate at about 30° C. After producing a substantially homogeneous blend, the formulation is cast, extruded or otherwise formed and cured at from about room temperature to about 60° C. from about 16 to about 24 hours to produce a solid, elastomeric propellant grain of predetermined configuration.

Preferably, to obtain the optimum in performance and properties in the grain, the blending, forming and curing operations are carried out in an inert atmosphere such as nitrogen or argon, for example, and in the absence of moisture. Also, substantially anhydrous mix components should be utilized. The resulting product grains can be stored indefinitely in a substantially anhydrous, inert atmosphere without detrimental physical degradation or performance loss.

The present composition having the difluoramino ester materials as binder, and which also has incorporated therein a perfluoroguanidine-formaldehyde copolymer, has a high specific impulse and finds utility as a propellant for rockets and rocket driven missiles.

The following Examples will serve to further illustrate the present invention but are not meant to limit it thereto.

EXAMPLE 1

A number of propellant grains were formed by blending together about 11.8 weight per cent plastisol grade nitrocellulose, about 11.8 weight per cent of substantially 1:1 copolymer of perfluoroguanidine and formaldehyde, about 34 weight per cent 2,3-bis(difluoramino)propyl formate, about 8.4 weight per cent lithium powder and about 34 weight per cent particulate nitronium perchlorate crystals. The resulting substantially homogeneous blend was cast into grains and these cured overnight, i.e. about 16 hours, at about 50° C. The cured grains were substantially void-free elastomeric materials.

Combustion studies on the cured products in closed bombs showed these burned smoothly and rapidly, without detonation, at pressures of from about 90 to 125 pounds per square inch.

EXAMPLE 2

A number of formulations of the present invention were fabricated into rocket grains. The combustion temperature and theoretical impulse of each of the resultant propellants were calculated. The propellant formulation data and performance results from this study are presented in Table I which follows.

Table I

| | Propellant Composition | | | | | Results | |
|---|---|---|---|---|---|---|---|
| Run No. | NC[1] | DPF[2] | PFG.CH$_2$O[3] | Li | NP[4] | AP[5] | Combustion Temperature | Specific Impulse |
| | (weight per cent) | | | | | | K° | Isp (sec.) |
| 1 | 10 | 30 | 45 | 12 | 3 | — | 3570 | 290.6 |
| 2 | 18 | 18 | 54 | 6 | 4 | — | 3923 | 291.1 |
| 3 | 10 | 30 | 45 | 9 | 6 | — | 3750 | 290.8 |
| 4 | 16 | 16 | 48 | 12 | 8 | — | 3780 | 296.4 |
| 5 | 16 | 16 | 48 | 9 | 11 | — | 3968 | 297.0 |
| 6 | 10 | 30 | 39 | 9 | 12 | — | 3842 | 293.6 |
| 7 | 10 | 30 | 42 | 6 | 15 | — | 3955 | 292.6 |
| 8 | 10 | 30 | 39 | 3 | 18 | — | 3964 | 291.2 |
| 9 | 10 | 30 | 27 | 15 | 18 | — | 3503 | 285.1 |
| 10 | 14 | 14 | 42 | 9 | 21 | — | 4011 | 298.0 |
| 11 | 10 | 30 | 21 | 15 | 24 | — | 3604 | 285.1 |
| 12 | 12 | 12 | 36 | 12 | 28 | — | 3957 | 296.2 |
| 13 | 10 | 10 | 30 | 18 | 32 | — | 3743 | 288.8 |
| 14 | 10 | 30 | 15 | 9 | 36 | — | 3831 | 288.1 |
| 15 | 10 | 10 | 30 | 12 | 38 | — | 3889 | 288.4 |
| 16 | 10 | 30 | 12 | 9 | 39 | — | 3805 | 285.7 |
| 17 | 10 | 10 | 30 | 6 | 44 | — | 3788 | 276.2 |
| 18 | 18 | 18 | 54 | 9 | — | 1 | 3658 | 289.1 |
| 19 | 10 | 30 | 42 | 15 | — | 3 | 3335 | 286.7 |
| 20 | 10 | 30 | 48 | 6 | — | 6 | 3604 | 285.2 |
| 21 | 10 | 30 | 42 | 9 | — | 9 | 3496 | 285.6 |
| 22 | 16 | 16 | 48 | 6 | — | 14 | 3668 | 286.1 |
| 23 | 10 | 30 | 33 | 9 | — | 18 | 3521 | 284.3 |
| 24 | 10 | 30 | 27 | 9 | — | 24 | 3480 | 281.6 |
| 25 | 10 | 30 | 21 | 9 | — | 30 | 3440 | 278.7 |
| 26 | 10 | 30 | 21 | 3 | — | 36 | 3466 | 272.6 |
| 27 | 10 | 30 | 15 | 9 | — | 36 | 3400 | 275.7 |

[1] nitrocellulose
[2] 2,3-bis(difluoramino)propyl formate
[3] perfluoroguanidine-formaldehyde; substantially 1:1 copolymer
[4] nitronium perchlorate
[5] ammonium perchlorate In a manner similar to that described for the foregoing Examples solid double base propellant grains can be fabricated using the other fuel oxidizer and binder components set forth hereinbefore.

Various modifications can be made in the present invention without departing from the spirit or scope thereof for it is understood that I limit myself only as defined in the appended claims.

I claim:

1. A solid double base propellant composition comprising on a weight basis;
   a. from about 3 to about 18 per cent of a particulated solid fuel,
   b. from about 1 to about 44 per cent of a particulated solid oxidizer,
   c. from about 15 to about 54 per cent of a copolymer of perfluoroguanidine and formaldehyde,
   d. from about 10 to about 18 per cent nitrocellulose, and
   e. from about 10 to about 30 per cent of a difluoramino containing organic ester.

2. A solid double base propellant composition consisting essentially of on a weight basis;
   a. from about 3 to about 18 per cent particulate lithium,
   b. from about 1 to about 44 per cent of a particulate member selected from the group consisting of nitronium perchlorate and ammonium perchlorate,
   c. from about 15 to about 54 per cent of a substantially 1:1 copolymer of perfluoroguanidine and formaldehyde,
   d. from about 10 to about 18 per cent nitrocellulose, and
   e. from about 10 to about 30 per cent of 2,3-bis(difluoramino)propyl formate.

3. A solid double base propellant composition consisting essentially of on a weight basis:
   a. from about 3 to about 18 per cent particulate lithium,
   b. from about 3 to about 44 per cent particulate nitronium perchlorate,
   c. from about 12 to about 48 per cent of a substantially 1:1 copolymer of perfluoroguanidine and formaldehyde,
   d. from about 10 to about 18 per cent nitrocellulose, and
   e. from about 10 to about 30 per cent 2,3-bis(difluoramino)propyl formate.

4. A solid double base propellant composition consisting essentially of on a weight basis:
   a. from about 6 to about 15 per cent particulate lithium,
   b. from about 1 to about 36 per cent ammonium perchlorate,
   c. from about 15 to about 54 per cent of a substantially 1:1 copolymer of perfluoroguanidine and formaldehyde,
   d. from about 10 to about 18 per cent nitrocellulose, and
   e. from about 16 to about 30 per cent 2,3-bis(difluoramino)propyl formate.

5. A solid double base propellant composition consisting essentially of on a weight basis:
   a. about 8.4 per cent particulate lithium,
   b. about 34 per cent particulate nitronium perchlorate,
   c. about 11.8 per cent of a substantially 1:1 perfluoroguanidine-formaldehyde copolymer,
   d. about 11.8 per cent plastisol grade nitrocellulose, and
   e. about 34 per cent 2,3-bis(difluoramino)-propyl formate.

* * * * *